United States Patent [19]

Flanagan

[11] Patent Number: 4,537,802

[45] Date of Patent: Aug. 27, 1985

[54] FLOOR FINISHING, CLEANING AND BURNISHING COMPOSITIONS CONTAINING UCON POLYMERS, AND METHOD OF USE

[76] Inventor: John J. Flanagan, #3 Summit Dr., Dune Acres, Ind. 46304

[21] Appl. No.: 646,137

[22] Filed: Aug. 31, 1984

[51] Int. Cl.$^3$ .................... C09G 1/04; C09G 1/16; C11D 3/37; C11D 3/43
[52] U.S. Cl. ........................ 427/368; 106/3; 252/153; 252/170; 252/171; 252/173; 252/174.21; 252/174.22
[58] Field of Search .............. 106/3, 6; 252/49.3, 252/52 R, 52 A, 75, 73, 153, 170, 172, 173, 174.21, 174.22; 427/368

[56] References Cited

U.S. PATENT DOCUMENTS

| | | | |
|---|---|---|---|
| 3,222,201 | 12/1965 | Boyle | 106/285 |
| 3,472,781 | 10/1969 | Ziemba | 252/75 |
| 3,669,892 | 6/1972 | Abler | 252/90 |
| 3,839,234 | 10/1974 | Roscoe | 252/544 |
| 3,882,038 | 5/1975 | Clayton | 252/164 |
| 3,957,667 | 5/1976 | Tanizaki | 252/73 |
| 4,274,884 | 6/1981 | Cartwright | 134/4 |
| 4,371,398 | 2/1983 | Forchielli | 106/10 |
| 4,446,044 | 5/1984 | Rutkiewic | 252/170 |

OTHER PUBLICATIONS

*Ucon Fluids and Lubricants,* published by Union Carbide, 1960, 52 page booklet.

*Primary Examiner*—Dennis L. Albrecht
*Attorney, Agent, or Firm*—Trexler, Bushnell & Fosse, Ltd.

[57] ABSTRACT

A buffing and burnishing composition for cleaning, polishing and for reconditioning plastic and plastic coated floor surfaces, and other floor surfaces to which floor finishes including "self-polishing" preparations have been applied. The composition includes a water soluble, low volatility, linear polymer of ethylene and propylene oxide as a combination low-volatility, lubricant and plasticizer, a glycol ether as a cooperating solvent, cleaner and coupling and stabilizing agent, and a surfactant as a wetting agent and cleaner, and water. The composition is characterized by the absence of wax and ingredients which give rise to wax-like residues, by the capability of effectively solubilizing and removing any clouding wax and wax-like deposits present, by a reduced evaporation rate, and an enhanced stability in the presence of heat generated during floor surface buffing and polishing procedures. The "active agents" contained in the formulation serve under the conditions of frictional heat generated during mechanical burnishing operations to neutralize or to repair minor use-derived surface blemishes through what is in effect a replasticization of the floor finish as a non-drying microfilm intimately coats and combines with the treated surface.

1 Claim, No Drawings

4,537,802

FLOOR FINISHING, CLEANING AND BURNISHING COMPOSITIONS CONTAINING UCON POLYMERS, AND METHOD OF USE

BACKGROUND AND FIELD OF THE INVENTION

The present invention relates to wax-free cleaning, buffing, and burnishing compositions for cleaning, polishing and reconditioning floor finishes. More particularly, the invention is directed to compositions for cleaning, burnishing, and for reconditioning plastic-based and plastic-coated floor surfaces and other floor surfaces to which floor finishes including self-polishing preparations have been applied.

Several different techniques and many different formulations have been used in the cleaning and maintenance of floor surfaces, including such surfaces as described above and, in addition, decorative hard surfaces and so-called "no-wax" plastic or plastic-coated surfaces. Many of the products presently being marketed are represented as satisfying the dual role of cleaners and floor polishing preparations. Typical formulations include surfactants in aqueous or in mixed solvent and aqueous solutions in combination with waxes, or wax-like materials or resinous materials. Most all floor finishes require considerable buffing or burnishing in order to develop an acceptable sheen or gloss.

The recommended method of application of the various types of preparations presently on the market also encompass a broad range of options. Some of the preparations are applied by spraying. Others are applied using a mop-like applicator. In most cases a substantial amount of buffing is required in order to develop maximum gloss in the treated surface.

Substantially all of the available preparations suffer from one or more shortcoming. Where wax- or resin-containing preparations are used and the surfaces are then buffed, the waxes respond favorably to the friction-generated heat, resulting in improved gloss in the treated surface. However, unless the recommended time frame between application and buffing is strictly followed, the desired gloss improvement is limited, overall appearance is impaired, or damage to the floor finish occurs. Some of the commercial preparations are objectionable due to the build-up of the wax or wax-like layer. The existence of such a layer then interferes with the proper cleansing and adversely affects the appearance of the floor in the subsequent treatment and maintenance cycle.

It is, therefore, a principal aim of the present invention to provide floor cleaning and polishing compositions and a method for application of such compositions to a floor substrate, which compositions avoid the deficiencies and inadequacies of the prior art preparations and facilitate excellent cleansing in combination with high residual gloss.

SUMMARY OF THE INVENTION

The present invention constitutes wax- or resin-free buffing and burnishing concentrates, as well as preparations in a ready-to-use form, for cleaning, polishing and for reconditioning plastic-based and plastic-coated floor surfaces as well as decorative hard surfaces to which floor finishes have been applied. Preferred embodiments of the invention serve effectively to impart a high degree of polish sheen to floor finishes including, but not limited to finishes derived from acrylic emulsions.

In preferred embodiments, the compositions of the invention include a water soluble, low volatility, linear polymer of ethylene and/or propylene oxide (a polyalkylene glycol) as a combination low-volatility lubricant, a glycol ether as a cooperating solvent, plasticizer, cleaner and coupling and stabilizing agent, and a surfactant as a wetting agent and cleaner, and water.

It is an important feature of the preparations of the invention that they are devoid of wax and ingredients which give rise to residues dissimilar in structure to the floor finish itself.

Yet another feature of the compositions of the invention is that they exhibit a markedly reduced evaporation rate, ensuring markedly increased flexibility in maintenance operations, which include burnishing the floor finish with equipment capable of operating at speeds of 1000 rpm or more.

An important advantage of the preparations of the invention, particularly in connection with the buffing associated with commercial applications and floor maintenance, is a markedly improved stability of the compositions and the residual films to the presence of heat of the type generated during floor surface buffing and polishing.

A related important feature of the compositions of the invention is that the "active agents" serve under the conditions of frictional heat generated during mechanical burnishing operations to neutralize or to repair minor use-derived surface blemishes through what is in effect a replasticization of the floor finish and the concurrent application of a non-drying microfilm which intimately coats and combines with the surface treated.

A related advantage of the floor treating preparations of the invention is that they are tolerant of and responsive to the heat generated during buffing operations to effect a burnishing of the floor finish to a high degree of hardness, durability and gloss not heretofore possible with prior art preparations.

The polymeric constituents of the floor treating compositions of the invention serve not only as effective cleaning agents but function to establish an intimate bond between the applied material and the floor dressing, for example, polymeric dressings.

The floor treating compositions of the invention, as used in accordance with the methods of the invention, act upon the floor substrate to effect cleaning, repair mars, remove "black marks" and provide a durable and aesthetically pleasing high gloss.

The floor treating preparations of the invention are effective to permeate and to migrate into the floor finish and, in effect, to establish a fusion or relamination of the surface coating or film.

Conveniently, the preparations of the invention may be used either in a concentrated form or may be simply and readily diluted for special and preferred modes of application.

Yet another feature of the floor treating preparations of the invention is that they are uniquely suited to withstanding the substantial heat generated through frictional forces during polishing and burnishing operations to establish a contiguously intimate residual film on the floor substrate and to effect a partial plasticization of the floor surface itself.

A related advantage of the compositions of the invention is that the compositions include components which serve effectively as lubricants retaining their utility even under the relatively high temperatures developed during machine buffing and polishing operations. The novel lubricity which characterizes the compositions of the invention allows a great deal of latitude and flexibility in the methods of use, which have not heretofore been possible, especially when water has been relied upon as the principal "lubricant".

Other and further objects, features, and advantages of the invention will become apparent from the following specifications.

DESCRIPTION OF PREFERRED EMBODIMENTS

The aims and objects of the invention are achieved by providing, in an aqueous solution or concentrate, a buffing and burnishing composition for cleaning, polishing and for reconditioning floor finishings of the type applied to plastic and plastic-coated floor surfaces as well as floors constituting decorative hard surfaces. The compositions include several distinct ingredients, each fulfilling its own significant role and which function in conjunction to clean as well as to effect a replasticization of the floor finish itself, leaving a non-drying protective microfilm as an intimate microcoating on the treated surface. In the preferred embodiments described, the combination cleaning and reconditioning compositions of the invention include a water soluble, low volatility, linear polymer constituting a polyalkylene glycol, preferably, ethylene and propylene oxide polymers. The polyalkylene glycol functions as a non-drying lubricant which effectively withstands the substantial heat generated during the buffing and polishing operations. In addition to the lubricating polyalkylene glycol, the preferred compositions of the invention include a glycol ether which serves as a cooperating solvent, cleaner and coupling and stabilizing agent. Finally, the aqueous compositions of the invention include a surfactant which functions as a wetting agent and cleaner. While non-ionic surfactants are preferred, other types of surface active agents are suitable.

The formulations of the invention are characterized by the absence of wax and ingredients which give rise to wax-like residues, by the capability of effectively solubilizing and removing any clouding blush of floor finish present on the treated substrate, by a reduced evaporation rate, by sustained lubricity characteristics and an enhanced stability in the presence of heat generated during floor surface buffing and polishing procedures. The "active agents" contained in the formulations serve under the conditions of frictional heat generated during mechanical burnishing operations to neutralize or to repair minor use-derived surface blemishes through a replasticization of the floor finish itself and the deposition of a non-drying protective microfilm which intimately coats and combines with the treated surface. These characteristics are especially important in burnishing operations where equipment speeds over 1000 rpm or more are common.

The following examples of formulations embodying the teachings of the invention are provided further to describe the invention and are not to be construed in any limiting sense. Example 1 set forth below indicates the components and relative concentrations in a buffing and burnishing concentrate of the invention.

EXAMPLE 1

| Ingredient | Concentration (Parts by Weight) |
|---|---|
| Polyalkylene glycol (linear polymer of ethylene and propylene oxide) | 0.1–2.0 |
| Glycol ether | 0.01–1.5 |
| Surfactant | 0.01–0.5 |

While many from a broad class of polyalkylene glycols may be used, in preferred embodiments of the invention the linear polymer of ethylene oxide and propylene oxide is a polyalkylene glycol having a viscocity in Saybolt Universal Seconds (S.U.S.) at about 100 degrees F., in the range of from about 50 to about 90,000. Such materials are available in the marketplace, for example, as products sold under the trademark UCON (Union Carbide Company). Glycols having relatively low vaporization rates, for example 30 on a scale in which butyl acetate has a rate of 100 at 25 degrees C. are preferred, specifically the products from the ethyl ether derivatives, and up in molecular weight. A preferred glycol ether is butoxytriglycol, and the preferred surfactants are surfactants of the "non-ionic" class.

Suitable anionics include alkyl sulfonate, alkylether sulfonates, alkanol amides, sulfonated amines and amides. Quaternary ammonium salts (cationic surfactants) may also be used.

The following example typifies a ready-to-use preparation which embodies the components of the combination which constitutes the present invention. It will be appreciated that lesser or greater amounts of diluting water may be used.

EXAMPLE 2

| Ingredient | Concentration (Parts by Weight) |
|---|---|
| Polyalkylene glycol (linear polymer of ethylene and propylene oxide) | 0.1–2.0 |
| Glycol ether | 0.01–1.5 |
| Surfactant | 0.01–0.5 |
| Water | 1–100 |

The method of preparing the concentrates (Example 1) and the ready-to-use formulations (Example 2) is not critical, it being necessary merely to combine and thoroughly mix the component ingredients.

Utilizing the composition of Example 2, a "ready-to-use" preparation, or any other desired dilution of the concentrate of the invention, the method of cleaning, burnishing and reconditioning a plastic and plastic-coated floor surface or other surface to which a floor finish has been applied is carried out as follows:

The aqueous composition including the polyalkylene glycol, the glycol ether, and the surfactant, and, additionally, any desired coloring agent, and/or opacifier, and/or perfuming agent, is applied to the floor surface, and distributed thereover so as effectively to wet the surface. Frictional scrubbing forces are then applied to the treated surface preferably by electrically driven rotary polishing and cleaning machinery, thus effecting a substantial rise in the temperature of the floor surface through the application of frictional forces. The procedure described operates effectively either before or after the water has evaporated to polish and burnish the floor. During the process the composition is distributed over the heated floor surface to establish a contiguously intimate residual film thereon and to effect a partial plasticization of the surface of the floor finish. Throughout the described procedure, the polyalkylene glycol acts effectively as a "non-drying" lubricant facilitating the even and effective cleaning of the floor as well as a heat aided fusion, curing minor blemishes in the floor finish and depositing a protective residual non-wax film.

The extended and sustained lubricity of the polyalkylene glycol, under the conditions of substantial frictional heat generated, contributes to the effectiveness of the burnishing and the polishing operation and, through fusion and replasticization, effects a neutralization and curing of blemishes and discontinuities in the floor finish itself.

While this invention has been described with reference to preferred embodiments and procedures, it is evident that the invention is not limited thereto. Further modification of the method and product disclosed herein which fall within the scope of the following claims will be immediately evident to those skilled in the art; to the extent that these changes and modifications are within the scope of the appended claims, they are to be considered a part of this invention.

What is claimed is:

1. The method of cleaning, burnishing and reconditioning a plastic and plastic coated floor surfaces and other floor surface to which a floor finish has been applied, said method comprising applying to the floor surface an aqueous composition including about 0.1 to about 2.0 parts by weight of an ethyl ether of a water-soluble linear polymer of ethylene oxide and propylene oxide having a viscosity in Saybolt Universal Seconds (S.U.S.) at about 100° F., in the range of from about 50 to about 90,000, about 0.01 to about 1.5 parts by weight of a glycol ether, about 0.01 to about 0.5 parts by weight of a surfactant different from said linear polymer, and about 1 to about 200 parts by weight of water, distributing said composition over the floor surface to wet the surface, impressing frictional scrubbing forces to the wet surface to generate heat, continuing the application of heat-generating frictional forces to the floor surface to effect a burnishing and polishing of the floor finish, and mechanically distributing the polymer of ethylene oxide and propylene oxide and the glycol ether of the composition over the heated floor surface to establish a contiguously intimate residual microfilm thereon to effect a partial plasticization of the floor finish and to improve gloss.

* * * * *

UNITED STATES PATENT AND TRADEMARK OFFICE
CERTIFICATE OF CORRECTION

PATENT NO.  : 4,537,802

DATED       : August 27, 1985

INVENTOR(S) : John J. Flanagan

It is certified that error appears in the above-identified patent and that said Letters Patent is hereby corrected as shown below:

Title page:

Please change Attorney, Agent, or Firm from "Trexler, Bushnell & Fosse, Ltd." to -- Michael G. Berkman---.

Signed and Sealed this

Third Day of December 1985

[SEAL]

Attest:

DONALD J. QUIGG

Attesting Officer

Commissioner of Patents and Trademarks